US012743407B2

(12) United States Patent
Du

(10) Patent No.: US 12,743,407 B2
(45) Date of Patent: Sep. 22, 2026

(54) PROCESSING DATA IN A DATA FORMAT WITH KEY-VALUE PAIRS

(71) Applicant: INTERNATIONAL BUSINESS MACHINES CORPORATION, Armonk, NY (US)

(72) Inventor: Ke Du, Xi'An (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 18/315,530

(22) Filed: May 11, 2023

(65) Prior Publication Data

US 2024/0378183 A1 Nov. 14, 2024

(51) Int. Cl.
*G06F 16/20* (2019.01)
*G06F 16/22* (2019.01)
*G06F 16/23* (2019.01)

(52) U.S. Cl.
CPC ...... *G06F 16/2246* (2019.01); *G06F 16/2365* (2019.01)

(58) Field of Classification Search
CPC ......................... G06F 16/2246; G06F 16/2365
See application file for complete search history.

(56) References Cited

U.S. PATENT DOCUMENTS

| | | | | |
|---|---|---|---|---|
| 8,190,835 | B1 * | 5/2012 | Yueh | G06F 3/067 711/170 |
| 11,146,286 | B2 | 10/2021 | Shetty | |
| 11,178,212 | B2 | 11/2021 | Maurer | |
| 2010/0211572 | A1 * | 8/2010 | Beyer | G06F 16/951 707/742 |
| 2019/0004726 | A1 * | 1/2019 | Li | G06F 3/0641 |
| 2022/0309549 | A1 * | 9/2022 | Xu | G06Q 30/04 |
| 2023/0282013 | A1 * | 9/2023 | Raad | G06V 30/153 382/190 |

FOREIGN PATENT DOCUMENTS

| | | | |
|---|---|---|---|
| CN | 103401562 | A | 7/2016 |
| CN | 108156173 | A | 6/2018 |
| CN | 109450450 | A | 3/2019 |
| CN | 110247665 | A | 9/2019 |

(Continued)

OTHER PUBLICATIONS

Cao et al. TDDFS: A Tier-Aware Data Deduplication-Based File System. ACM Transaction on Storage 15:1, 2019, pp. 1-26. (Year: 2019).*

(Continued)

*Primary Examiner* — Mahesh H Dwivedi
(74) *Attorney, Agent, or Firm* — Lily Neff

(57) ABSTRACT

Disclosed are a computer-implemented method, a computer system and a computer program product for processing data in a data format with key-value pairs. All keys can be extracted from a plurality of data objects of the data. Duplicated keys can be removed such that only one of the same keys remains. The data in the data format can be reorganized into a format with a key portion followed by a value portion. The extracted keys can be arranged in the key portion in a predetermined order. The values of each of the plurality of data objects can be arranged in the value portion in an order corresponding to the order of the keys.

18 Claims, 10 Drawing Sheets

(56) References Cited

FOREIGN PATENT DOCUMENTS

| | | | |
|---|---|---|---|
| CN | 111342933 | A | 6/2022 |
| CN | 114665887 | A | 9/2022 |

OTHER PUBLICATIONS

Data deduplication vs. data compression. 2022, pp. 1-10. https://www.lytics.com/blog/data-deduplication-vs-data-compression/. (Year: 2022).*

Storer et al. Secure data deduplication. StorageSS'08, pp. 1-10. (Year: 2008).*

Buono et al., "Enhance Inter-service Communication in Supersonic K-Native REST-based Java Microservice Architectures", Kristianstad University Sweden, Spring Semester 2021, 56 pages.

Muller, "JSON Compression", heap.ch/blog/2016/06/19/json-compression/, Jun. 19, 2016, 7 pages.

* cited by examiner

COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

DATA PROCESSING 200

PERIPHERAL DEVICE SET 114

UI DEVICE SET 123

STORAGE 124

IoT SENSOR SET 125

NETWORK MODULE 115

END USER DEVICE 103

WAN 102

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

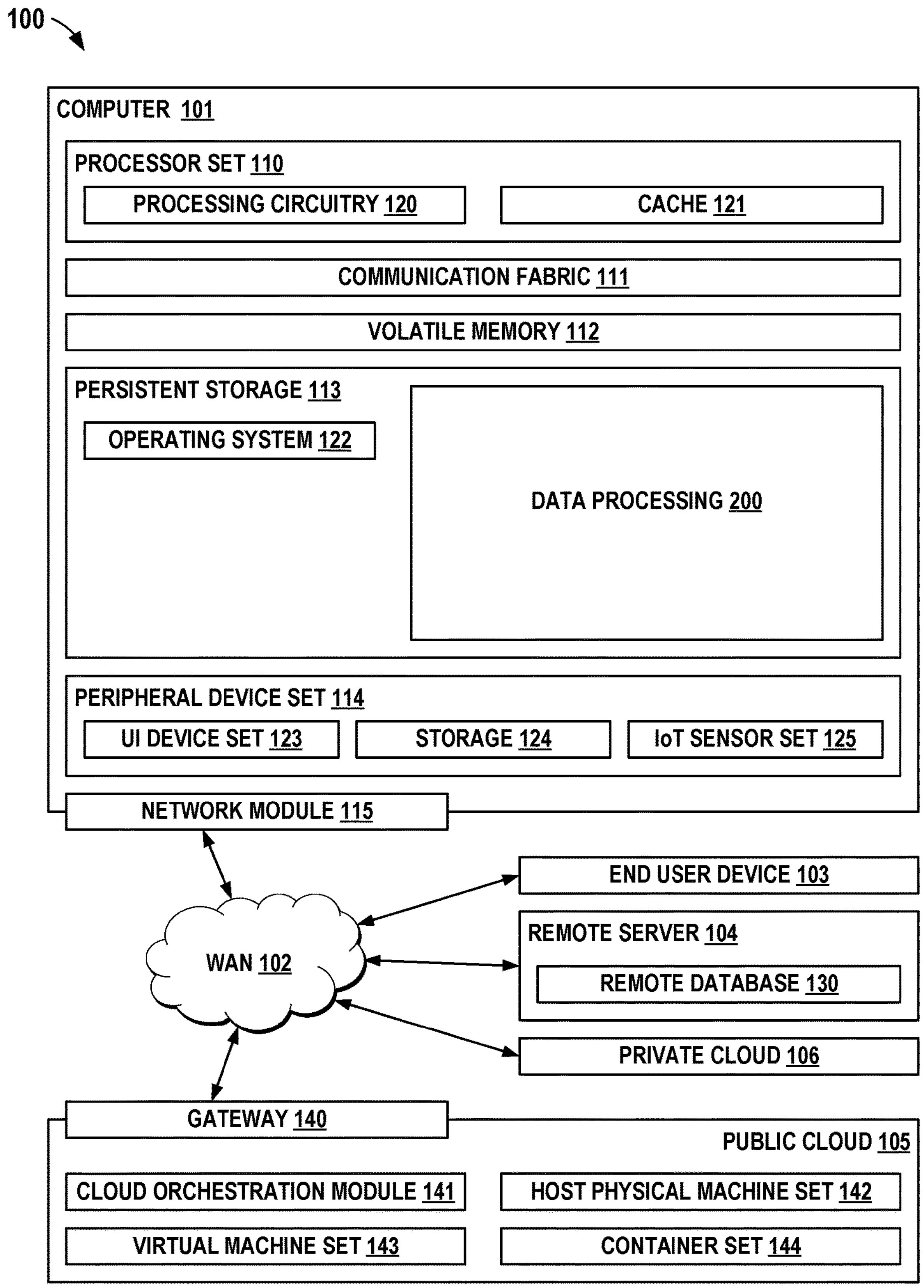

```
[
 {
  "id": "100021",
  "name": "mnist-train-01",
  "type": "tensorflow",
  "app" : {
    "host_name": "vm-linux-01",
    "cpu": "61%",
  }
  "tags": ["green", "yellow"],
 },
 {
  "id": "100022",
  "name": "mnist-train-02",
  "type": "tensorflow",
  "app" : {
    "host_name": "vm-linux-02",
    "cpu": "29%",
  },
  "tags": ["red", "green", "blue"],
 },
 ......
]
```

PROCESSING DATA IN A DATA FORMAT WITH KEY-VALUE PAIRS

BACKGROUND

The present disclosure relates to data processing, and more specifically, to processing data in a data format with key-value pairs.

In recent years, there is an increasing need for real-time server-to-client services, and the communication between the server and client often uses a lightweight format for storing and exchanging data. Examples of the lightweight data-interchange formats include Extensible Markup Language (XML), JavaScript Object Notation (JSON) and the like, which are easy for humans to read and write and are also easy for machines to parse and generate.

However, when a large amount of data in these formats is stored or transmitted, the requirement on storage resources will be increased and the efficiency of data communication will be decreased, which may lead to excessive consumption of storage resources and impact the user's experience in the real-time services.

SUMMARY

According to one embodiment of the present disclosure, there is provided a computer-implemented method for processing data in a data format with key-value pairs. In this method, all keys can be extracted from a plurality of data objects of the data. Duplicated keys can be removed such that only one of the same keys remain. The data in the data format can be reorganized into a format with a key portion followed by a value portion. The extracted keys can be arranged in the key portion in a predetermined order. The values of each of the plurality of data objects can be arranged in the value portion in an order corresponding to the order of the keys.

According to another embodiment of the present disclosure, there is provided a system for processing data in a data format with key-value pairs. The system includes one or more processors, a memory coupled to at least one of the processors and a set of computer program instructions stored in the memory. When executed by at least one of the processors, the set of computer program instructions perform following actions. All keys can be extracted from a plurality of data objects of the data. Duplicated keys can be removed such that only one of the same keys remain. The data in the data format can be reorganized into a format with a key portion followed by a value portion. The extracted keys can be arranged in the key portion in a predetermined order. The values of each of the plurality of data objects can be arranged in the value portion in an order corresponding to the order of the keys.

According to another embodiment of the present disclosure, there is provided a computer program product for processing data in a data format with key-value pairs. The computer program product includes a non-transitory computer readable storage medium having program instructions embodied. The program instructions are executable by a processor to cause the processor to perform following actions. All keys can be extracted from a plurality of data objects of the data. Duplicated keys can be removed such that only one of the same keys remain. The data in the data format can be reorganized into a format with a key portion followed by a value portion. The extracted keys can be arranged in the key portion in a predetermined order. The values of each of the plurality of data objects can be arranged in the value portion in an order corresponding to the order of the keys.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 1 shows an exemplary computing environment which is applicable to implement the embodiments of the present disclosure, according to an embodiment of the present disclosure;

DETAILED DESCRIPTION

Figure 2:
FIG. 2 depicts a conventional data format with key-value pairs, according to an embodiment of the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as data processing 200, referred to as block 200, for a data format with key-value pairs. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is understood that the computing environment 100 in FIG. 1 is only provided for illustration purpose without suggesting any limitation to any embodiment of this disclosure, for example, at least part of the program code involved in performing the inventive methods could be loaded in cache 121, volatile memory 112 or stored in other storage (e.g., storage 124) of the computer 101, or at least part of the program code involved in performing the inventive methods could be stored in other local or/and remote computing environment and be loaded when need. For another example, the peripheral device 114 could also be implemented by an independent peripheral device connected to the computer 101 through interface. For a further example, the WAN may be replaced and/or supplemented by any other connection made to an external computer (for example, through the Internet using an Internet Service Provider).

As mentioned above, some standard data-interchange formats, such as Extensible Markup Language (XML) and JavaScript Object Notation (JSON), are widely used for real-time communications in the server-to-client services. The above-mentioned data-interchange formats are plain text-based formats for storing and sharing data, and typically written in key-values pairs. For example, JSON is a lightweight, text-based data interchange format widely used in real-time server-to-client services, for example, when data is sent from a server to a web page to be rendered on the client side. In modem application architectures, the communication between microservices also often uses the JSON format. However, when a large amount of data in the JSON format needs to be stored or transmitted, the requirement on the data storage resources will be increased and the efficiency of the data communication will be decreased. For example, when a large amount of JSON data that makes up a web page is transmitted and rendered to a user, the user may have to wait long before the full web page is loaded on the browser of his or her client, and thus the real-time experience in the web page browsing is heavily degraded. There is, however, no efficient approach to compress JSON data to reduce the amount of data needed for the data storage or transmission.

FIG. 2 depicts a conventional data format 200A with key-value pairs. As shown in FIG. 2, the data format 200A can be of the JSON format, which is a plain text-based, lightweight data format for storing and transmitting data in key-value pairs. As an exemplary scenario in which data with key-value pairs is stored and/or transmitted, the JSON format can be used when web page data is sent from a server to a client for rendering the data to a user browsing the web page. The data format 200A includes multiple data objects written within a pair of square brackets, such as data object 202-*a*, data object 202-*b*, and so forth. Each of data objects 202-*a* and 202-*b* as shown in the dotted block of FIG. 2 can be written inside a pair of curly braces, and includes multiple key-values pairs. The multiple key-value pairs of each data object are separated from each other by a comma. Each key-value pair of data objects 202-*a* and 202-*b* is composed of a value paired with its key. The key and value in each key-value pair are separated by a colon in the middle, with the key on the left and the value on the right. For the JSON format, the key is a string surrounded by double quotation marks, and the value can be one of the following types: a string, a number, an object, an array, a Boolean (true or false) and null. Details for the JSON format are known to those skilled in the art and omitted herein.

As shown in FIG. 2, the data structure of the conventional data format 200A with key-value pairs can be a nested and hierarchical data structure. For both data object 202-*a* and data object 202-*b*, the keys on a first level of a tree structure of the data format 200A may include “id”, “name”, “type”, “app” and “tags” surrounded by double quotation marks. As for key “id”, the value paired with “id” is “100021” for data object 202-*a* and “100022” for data object 202-*b*, and both of the values are of a string type including a sequence of Unicode characters and surrounded by double quotation marks. Similarly, for keys “name” and “type”, the counterpart values are also of a string type for data objects 202-*a* and 202-*b*. For key “app”, the counterpart value is also a key-value structure nested therein, and the nested structure has another collection of key-value pairs surrounded by curly braces. The nested structure includes the keys of “host_name” and “cpu” surrounded by double quotation marks, which are on a second level (namely, at leaf nodes in this example) of the tree structure of the data format 200A. For key “tags”, the counterpart value is an array which includes a list of values surrounded by square brackets, such as “green” and “yellow” and the like.

It should be noted that the data format 200A as shown in FIG. 2 is only an example of various data formats with key-pairs. The number of data elements (such as keys and values) and the hierarchical structure of the data format for representing the data to be processed may be different from the precise form as shown in FIG. 2. For example, the data to be processed (e.g., to be compressed) may include additional data elements, fewer data elements, additional or fewer levels of the hierarchical structure, and/or differently arranged data elements than those depicted in FIG. 2.

As mentioned above, when a large amount of JSON data needs to be stored or transmitted, the increasing size of JSON data will impose a higher requirement on data storage resources and affect the communication efficiency for web page loading at the client’s browser. For example, each value needs a counterpart key in a respective key-value pair of the JSON data, so there are many duplicated keys in the JSON data, resulting in an excessive amount of data.

In this regard, there are some existing data compression approaches to process the JSON data, in order to reduce the amount of data needed for the storage or transmission of the original JSON data, for example, by encoding the data using fewer bits than the original representation. With these data compression approaches, the costs of storage and transmission can be reduced, typically through the use of several encoding techniques, such as Huffman coding. However, in these data compression approaches, a binary computing needs to be performed on the JSON data to further encode or transform the data elements in the JSON data into a series of binary bits. For example, the JSON data can be compressed by encoding each data element written in plain text-based language as a collection of “1” and “0”, according to a particular set of coding rules. Accordingly, the data elements of the JSON data are stored in the compressed data as the collection of binary bits “1” and “0” instead of the explicit information originally written in plain text. As a result, the compression of JSON data into a collection of binary bits makes the compressed data no longer easy to read or parse and it is also impossible to search directly in the compressed data.

In view of the above, there exists a need for an efficient approach to compress data in a data format with key-value pairs to reduce the amount of data needed for storage or transmission while maintaining the searchable property.

Embodiments of the present disclosure aim to solve at least one of the technical problems described above, and propose a method, system and computer program product for processing data in a data format with key-value pairs by way of removing duplicated keys and reorganizing the data format into a more efficient data format with a key portion followed by a value portion, which allows for significant storage savings, faster transmission and direct search of the compressed data. In the data compression approaches according to embodiments of the present disclosure, all keys can be extracted from a plurality of data objects of the data to be processed, wherein duplicated keys can be removed such that only one of the same keys is remained in the data structure, which may effectively reduce the amount of data which would otherwise be occupied by the duplicated keys.

According to embodiments of the present disclosure, the original data format can be reorganized into an efficient format with a key portion followed by a value portion, wherein the extracted keys can be arranged in the key portion in a predetermined order, and the values of each of the plurality of data objects can be arranged in the value portion in an order corresponding to the order of the keys. In such a way, by arranging the extracted keys and the counterpart values in a consistent order, the amount of data required by the data storage or transmission is reduced, while the compressed data is still easy to read, such that a direct search within the compressed data is still possible. As a result, the requirements on resources for the data storage can be reduced and the communication efficiency between the server and client can be increased.

Embodiments of the present disclosure efficiently process the data with key-value pairs by reorganizing the original data format into a more efficient format, which efficiently compresses the data without the binary encoding and/or decoding process typically required by conventional data compression approaches, while still maintaining the good properties of being easy understand. In addition, a lot of non-information data (such as double quotation marks surrounding the key and/or values) can also be removed to obtain a higher efficiency for data compression. For example, the embodiments of the present disclosure are particularly applicable for various existing standard lightweight data-interchange formats such as XML and JSON formats with explicit and readable information, which will be described in detail hereinafter.

Figure 3:
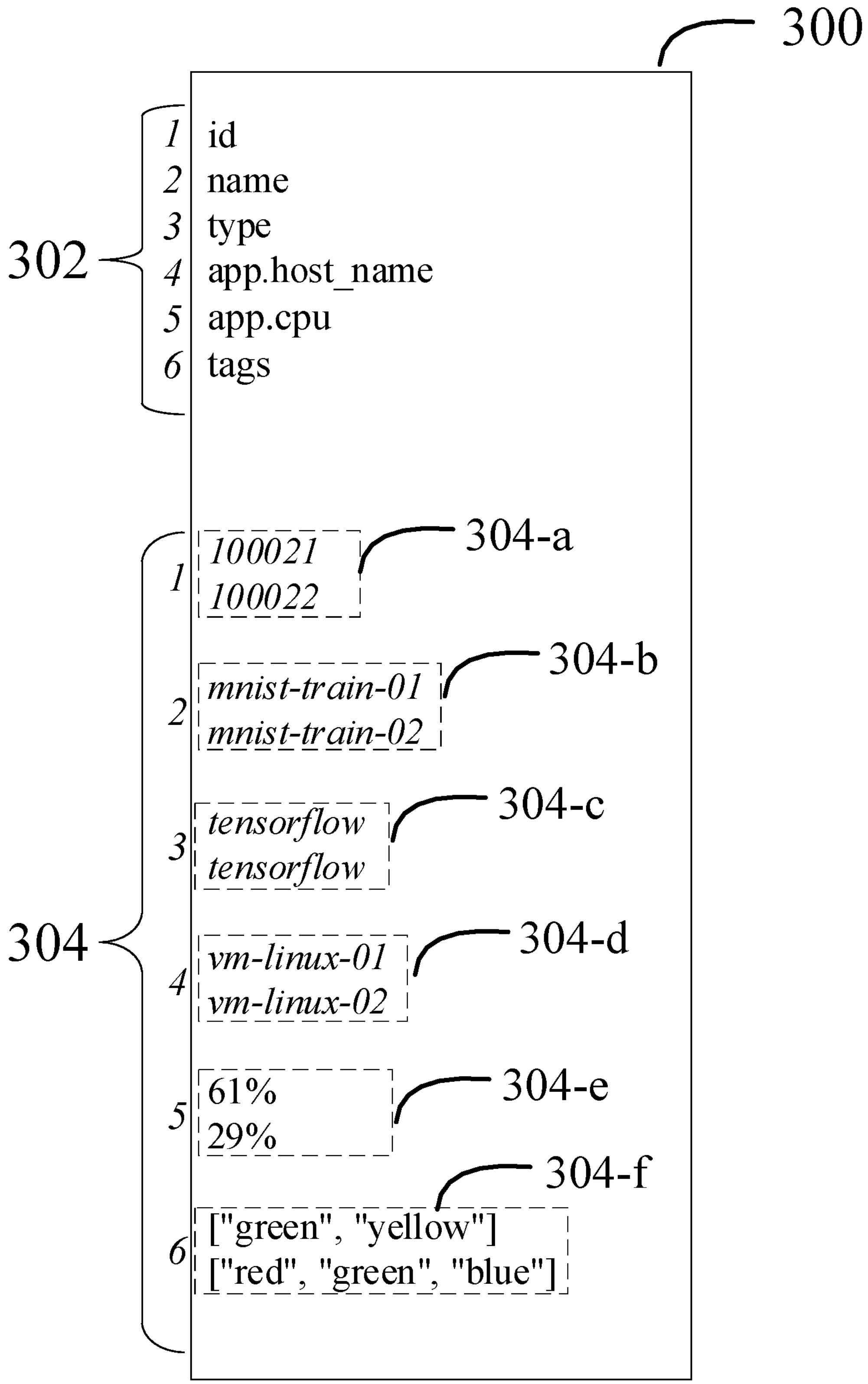
FIG. 3 depicts a reorganized data format obtained by processing data in a data format with key-value pairs according to an embodiment of the present disclosure.

FIG. 3 depicts a reorganized data format 300 obtained by processing data in a data format with key-value pairs (e.g., by reorganizing the data format 200A as shown in FIG. 2) according to an embodiment of the present disclosure. Details of the processing on the data will be described in FIG. 2 through FIG. 10 following.

In an embodiment of the present disclosure, when processing the data in the data format with key-value pairs (e.g., when compressing the data), all keys from a plurality of data objects of the data can be extracted. Particularly, duplicated keys can be removed such that only one of the same keys is remained in the extracted keys.

As shown in FIG. 2 and FIG. 3, all keys from the plurality of data objects of the data can be extracted, for example, by determining key paths of all leaf nodes of a tree structure of the data in the original data format. In addition, duplicated keys can be removed, for example, by determining whether two key paths for keys from different data objects of the plurality of data objects are the same, such that only one of the same keys remain in the extracted keys. Accordingly, the data in the data format 200A as shown in FIG. 2 can be compressed into a reorganized data format 300 with a key portion 302 followed by a value portion 304 as shown in FIG. 3.

For example, for both data objects 202-*a* and 202-*b*, the keys "id", "name", "type" and "tags" as shown in FIG. 2 on the first level of the tree structure of the original data are leaf nodes since they do not have child nodes, whereas the key "app" as shown in FIG. 2 on the first level is not a leaf node since it has two child keys, namely, "host_name" and "cpu". In addition, the nested keys "host_name" and "cpu" on the second level of the tree structure are leaf nodes since they do not have child nodes, and the key paths for the leaf nodes on the second level can be determined by concatenating the parent key (e.g., "app") with a respective child key (e.g., "host_name" or "cpu"). When traversing the leaf nodes of the tree structure of the data in the original data format 200A, the key paths of all the leaf nodes can be determined as "id", "name", "type", "app.host_name", "app.cpu" and "tags", and then arranged in the key portion 302 of the data format 300 of FIG. 3 as the extracted keys.

As can be seen in FIG. 2, the key path for the key-value pair "id":"100021" in data object 202-*a* is the same as the key path for the key-value pair "id":"100022" in data object 202-*b*. Since the same key path exists in data objects 202-*a* and 202-*b*, the key "id" can be determined as one of the duplicated keys (namely, which would be stored at least twice in the data format 200A for the different data objects 202-*a* and 202-*b*) and should be removed. Accordingly, as shown in FIG. 3, only one instance of the key "id" remains in the key portion 302 of the data format 300. The same is true for other duplicated keys such as "name", "type", "app.host_name", "app.cpu" and "tags". In this manner, the amount of storage resources occupied by the duplicated keys can be reduced effectively.

In addition, in the reorganized data format 300 of FIG. 3, the extracted keys can be arranged in the key portion 302 in a predetermined order, and the values of each of the plurality of data objects can be arranged in the value portion 304 in an order corresponding to the order of the keys. In an embodiment, the predetermined order for the extracted keys can be an order of traversing leaf nodes of the tree structure of the data in the original data format with key-value pairs, and the same order is also used for arranging the values in the value portion 304.

Figure 4:
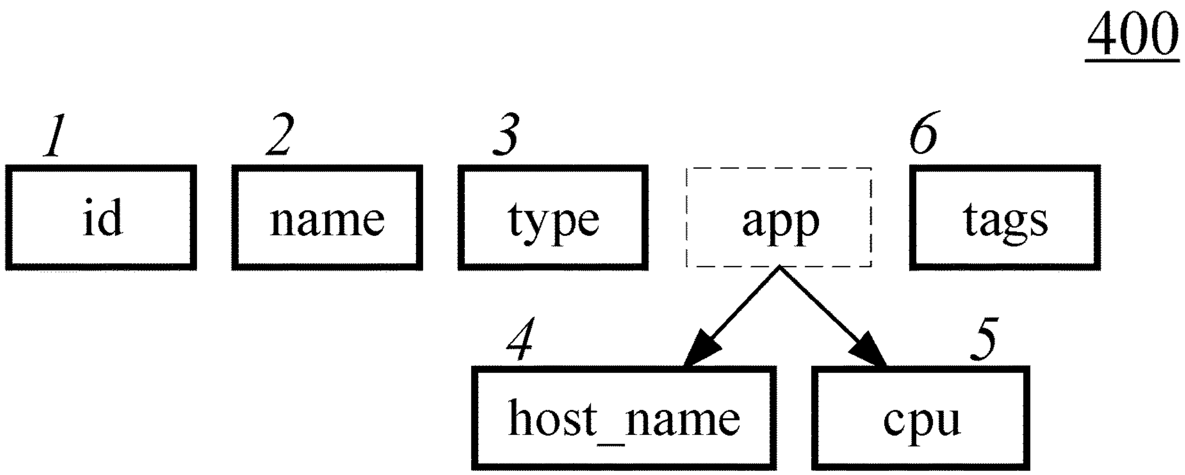
FIG. 4 depicts a predetermined order for arranging extracted keys in a key portion in a reorganized data format according to an embodiment of the present disclosure.

FIG. 4 depicts a predetermined order 400 for arranging the extracted keys in the key portion in the reorganized data format according to an embodiment of the present disclosure. Details of the predetermined order will be described in FIG. 5 following.

As shown in FIG. 4, the predetermined order for arranging the extracted keys in the key portion 302 of the reorganized data format 300 of FIG. 3 can be an order of traversing leaf nodes of the tree structure of the data in the data format 200A of FIG. 2. In an embodiment, when traversing the leaf nodes of the tree structure of the data in the data format 200A as shown in FIG. 2, the leaf nodes can be traversed in the order in which the nodes appear in the tree structure, and all child nodes (e.g., "app.host_name" and "app.cpu") of a parent node (e.g., "app") should be traversed before traversing to a next node (e.g., "tags") in the same level as the parent node. As shown in FIG. 4, the predetermined order for arranging the extracted keys is labeled based on natural numbering (e.g., 1 through 6) of the extracted keys when traversing all the leaf nodes of the tree structure.

Referring back to FIG. 3, as mentioned above, a consistent order is used for arranging the extracted keys in the key portion 302 and arranging the counterpart values in the value portion 304. In an embodiment, the values corresponding to each of the extracted keys for the plurality of data objects can be grouped into a respective value group. Accordingly, the respective value groups can be arranged in the value portion 304 (e.g., arranged in value partitions 304*a* through 304-*f*) in the order corresponding to the order of the keys, such that the consistent order is used for the keys and values, which allows for easy readability and direct search of the compressed data, which will be described in detail hereinafter.

Specifically, as shown in FIG. 3, the extracted keys, such as "id", "name", "type", "app.host_name", "app.cpu" and "tags" are arranged in the key portion 302 in a predetermined order, which is labeled based on natural numbering of the extracted keys (e.g., from 1 to 6). In the value portion 304 following the key portion 302, for each of the extracted keys (such as "id"), the values (such as "100021" and "100022") from the plurality of data objects (such as data objects 202-*a* and 202-*b* in FIG. 2) are grouped into a respective value group, and this value group is arranged in a respective value partition (such as value partition 304-*a*) of the value portion 304. Accordingly, the respective value groups corresponding to different ones of the extracted keys can be arranged in different value partitions (such as value partitions 304-*a* through 304-*f*) of the value portion 304 in the order corresponding to the order of the keys, which is similarly labeled based on the natural numbering of the keys (e.g., from 1 to 6).

It can be understood that the key portion 302 and value portion 304 of the data format 300 can be separated by various types of separators recognizable by machines, such as a predetermined number of blank lines. Similarly, the respective value partitions 304-*a* through 304-*f* within the value portion 304 of the data format 300 can be separated by another type of separator. The present disclosure does not restrict the detailed types of the separators.

It should be noted that although the extracted keys in the key portion 302 and the respective value partitions 304-*a* through 304-*f* of the value portion 304 are labeled in FIG. 3 with a series of natural numbers (e.g., from 1 through 6), the labels are only for the purpose of clearly showing the mapping or association between the extracted keys and the counterpart values (and equivalently the consistent order used for arranging the extracted keys and the counterpart values) and for the purpose of illustrating the principle of compressing data according to natural coding of leaf nodes of the tree structure of the data with key-value pairs. Actually, it is not needed to store the natural numbers in the reorganized data format 300. Instead, the mapping or association between the extracted keys in the key portion 302 and counterpart values in the value portion 304 is implied by the consistent numerical order used for arranging the extracted keys and counterpart values. For example, in a more general case, the n-th extracted key in the key portion 302 is always paired with the values from the value group in the n-th value partition of the value portion 304.

On the other hand, it can be contemplated in the present disclosure that there are not only duplicated keys in the key-value pairs of the plurality of data objects of the data to be processed, but also duplicated parts shared by the values in the key-value pairs of different data objects. In view of this, there exists a further need for an efficient approach to compress the data with key-value pairs to further reduce the amount of data needed for storage or transmission of the data, for example, by effectively saving the storage or transmission resources that would otherwise be wasted by the duplicated parts of the values. In an embodiment, the duplicated parts (or equivalently, the reused parts) shared by the values of different data objects of the plurality data object can be removed, for example, to further reduce the amount of data required to store or transmit the compressed data.

Figure 5:
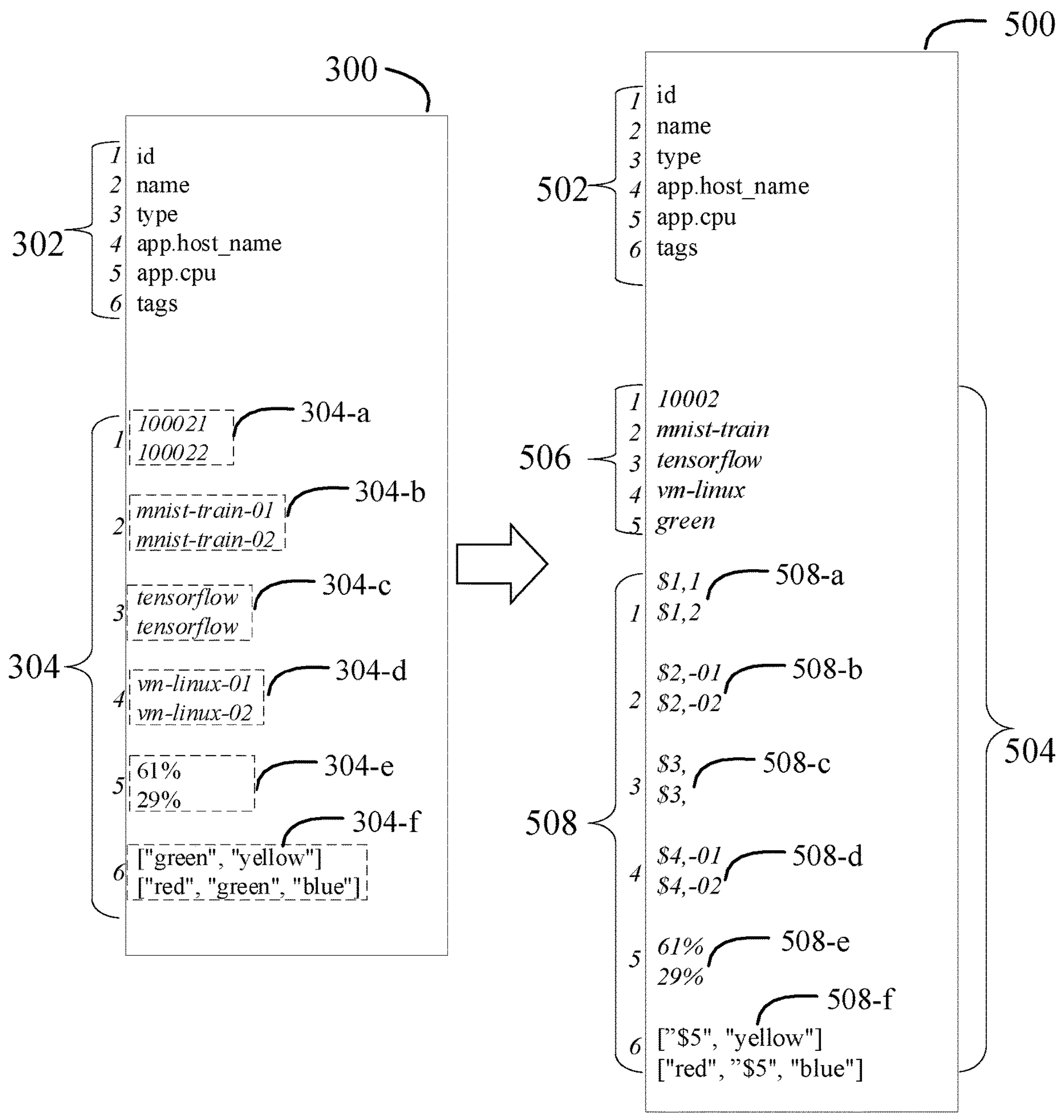
FIG. 5 depicts an exemplary schematic diagram of refining a value portion of a reorganized data format based on determining reused parts shared by the values of different data objects according to an embodiment of the present disclosure.

FIG. 5 depicts an exemplary schematic diagram of refining a value portion of a reorganized data format based on determining reused parts shared by the values of different data objects according to an embodiment of the present disclosure.

As shown in FIG. 5, it can be understood that a reorganized data format 500 can be obtained by refining the value portion 304 of the reorganized data format 300 of FIG. 3 based on determining the reused parts shared by the values of different data objects of the plurality of data objects. Specifically, the key portion 502 of the reorganized data format 500 on the right side in FIG. 5 is the same as the key portion 302 of the reorganized data format 300 on the left side in FIG. 5 (which is reproduced from the data format 300 in FIG. 3). The differences between the reorganized data formats 300 and 500 lie in that the value portion 504 of the reorganized data format 500 further includes a reused-part partition 506 and a series of value partitions 508 (e.g., value partitions 508*a* through 508*f*), the details will be described hereinafter.

In an embodiment, a reused part shared by the values of different data objects of the plurality of data objects can be determined. Accordingly, the value portion includes a reused-part partition in which the reused part is arranged in a position corresponding to a reference to the reused part, and the reused part of the values sharing the reused part in the value portion can be replaced by the reference to the reused part, which will be described in connection with FIG. 5.

For example, as shown on the left side in FIG. 5, for at least one of the value partitions 304-*a* through 304-*f* (e.g., value partition 304-*a*), a reused part (e.g., 10002) is shared by the values (e.g., 100021 and 100022) of different data objects (e.g., data object 202-*a* and data object 202-*b* as shown in FIG. 2) of the plurality of data objects. The reused part can be determined by comparing, within each value group arranged in a respective value partition 304-*a* through 304-*f*, whether the values from different data objects share the same content partly or entirely. For clarity of descriptions, each of the determined reused parts is marked in shadows in a respective value partition 304-*a* through 304-*f*, such as 10002, mnist-train, tensorflow, vm-linux, green.

Accordingly, as shown on the right side in FIG. 5, each of the reused parts can be arranged in the reused-part partition 506 as one of a list of reused parts shared by the values of the different data objects. Similar to the labels used for labeling the order for arranging the keys in the key portion 502, another series of natural numbers (e.g., from 1 to 5) is used to label the order of arranging the reused parts in the reused-part partition 506. In this case, the reference to the reused part includes the position of the reused part within the list of the reused-part partition. For example, the numerical order for arranging the reused parts in the reused-part partition 506 can be used as the references to the respective reused parts.

As shown in FIG. 5, the value portion 504 is divided into the reused-part partition 506 and a collection of value partitions 508, such as value partitions 508*a*-508*f*. In an embodiment, the values corresponding to each of the extracted keys for the plurality of data objects are grouped into a respective value group, and the respective value groups are arranged in respective value partitions (e.g., value partitions 508*a*-508*f*) of the value portion (e.g., value portion 504) in the order corresponding to the order of the keys. Further as shown in FIG. 5, the reused part of the values sharing the reused part in a respective value partition (e.g., value partitions 508*a*-508*f*) is replaced by the reference to the reused part. For example, the reused part 10002 is replaced by $1 in value partition 508*a*, and a comma is used to separate the reference $1 from the non-duplicated part of the value. Similarly, the reused part mnist-train is replaced by $2 in value partition 508*b*, and so forth.

It can be understood that the natural numbers from 1 through 5 as shown in FIG. 5 are used only for the purpose of clearly showing the numerical order for arranging the reused parts in the reused-part partition 506 and for the purpose of illustrating the principle of further data compression according to natural coding of repeated content of the values, such that the numerical order can be used as references to invoke the respective reused parts. The numerical order for arranging the reused parts in the reused-part partition 506 may or may not be arranged together with the reused parts in the reused-part partition 506. For example, if the numerical order is not explicitly arranged together with the reused parts in the reused-part partition 506, the numerical order can still be implied by the relative positions of the reused parts in the reused-part partition 506.

It should be noted that in the above example, the reference to the reused part may be represented by a symbol "$" together with a position (e.g., a numerical order) of the reused part within the list of the reused-part partition. Other symbols can be used as long as the machines can recognize the symbol as a reference to a reused part shared by the values of different data objects. The present disclosure does not restrict the detailed forms of the reference to the reused part shared by the values of different data objects, which is used to represent the reused part in a simplified form.

According to embodiments of the present disclosure, data with key-value pair can be further compressed by replacing the reused part shared by the values of different data objects with a simplified symbol (e.g., a symbol plus a natural number, which is used as a reference to the reused part), which leads to a further decrease in the amount of storage resources required for storing the compressed data and a further increase in the efficiency of transmitting the compressed data.

Figure 6:
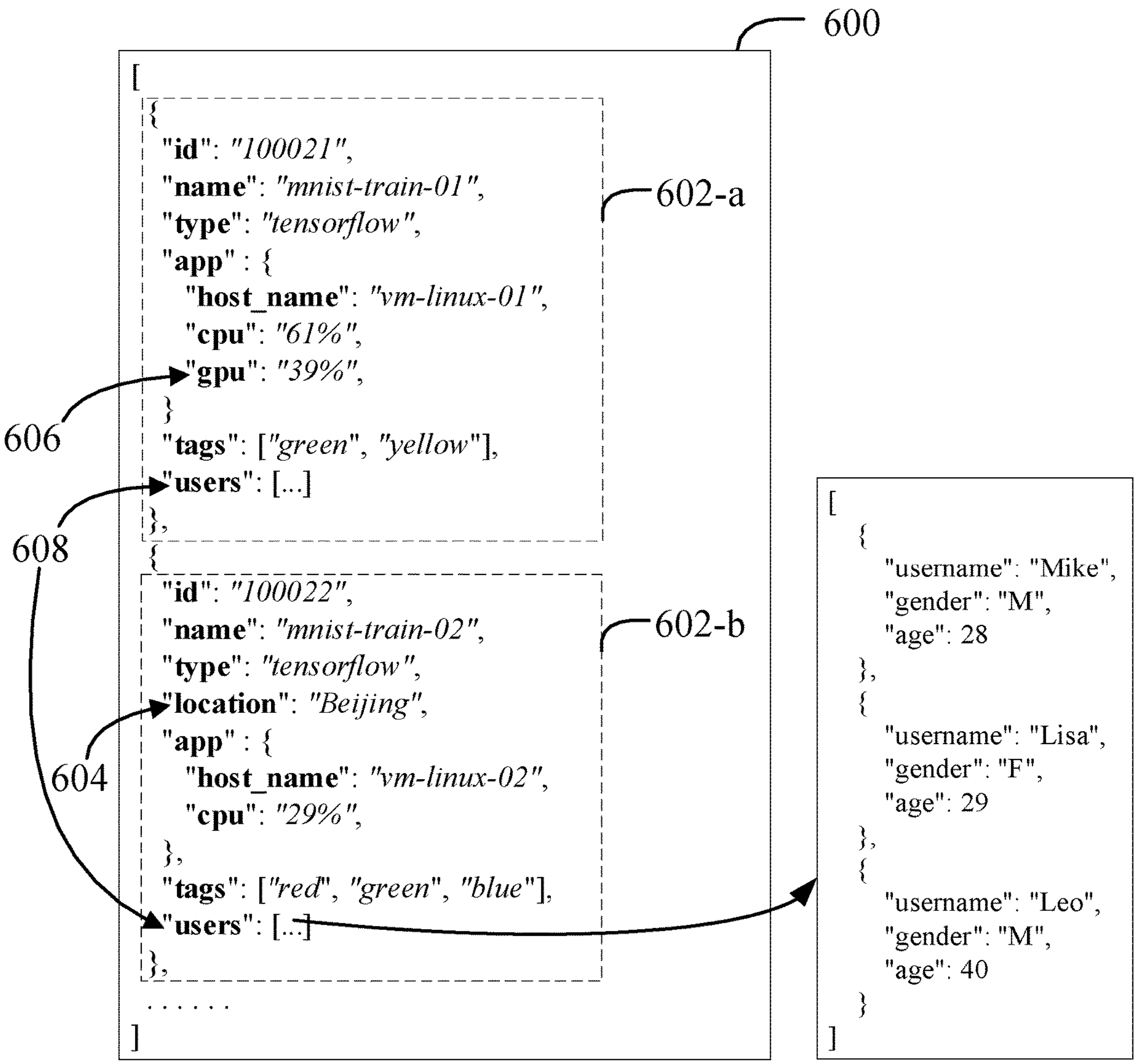
FIG. 6 depicts another conventional data format with key-value pairs according to an embodiment of the present disclosure.

FIG. 6 depicts another conventional data format 600 with key-value pairs. The data format 600 as shown in FIG. 6 is basically the same as the data format 200A as shown in FIG. 2, but it is used in a more general case. As shown in FIG. 6, the data format 600 includes multiple data objects written within a pair of square brackets, such as data object 602-*a*, data object 602-*b*, and so forth. The differences between the data formats 200A and 600 lie in that: in the data format 200A, the keys of the key-value pairs are exactly the same for data object 202-*a* and data object 202-*b*, whereas in the data format 600, one data object of the multiple data objects may have more keys, less keys, or different nested structures for the keys than another data object. For example, as shown in FIG. 6 and by reference sign 604, a key "location" exists in data object 602-*b* but not in data object 602-*a*. In addition, as shown in FIG. 6 and by reference sign 606, the key "app" has three key-value pairs nested therein for data object 602-*a*, but has two key-value pairs nested therein for data object 602-*b*.

As shown in FIG. 6 and by reference sign 608, the differences between the data formats 200A and 600 further lie in that each of data object 602-*a*, data object 602-*b* includes a key "users", which is paired with a value in the form of a complex array with a collection of key-value pairs nested therein, such as the nested keys "username", "gender" and "age" and the counterpart values paired with them. The processing of the data in the data format 600 as shown in FIG. 6 will be described in detail in connection with FIG. 7 and FIG. 8 hereinafter.

Figure 7:
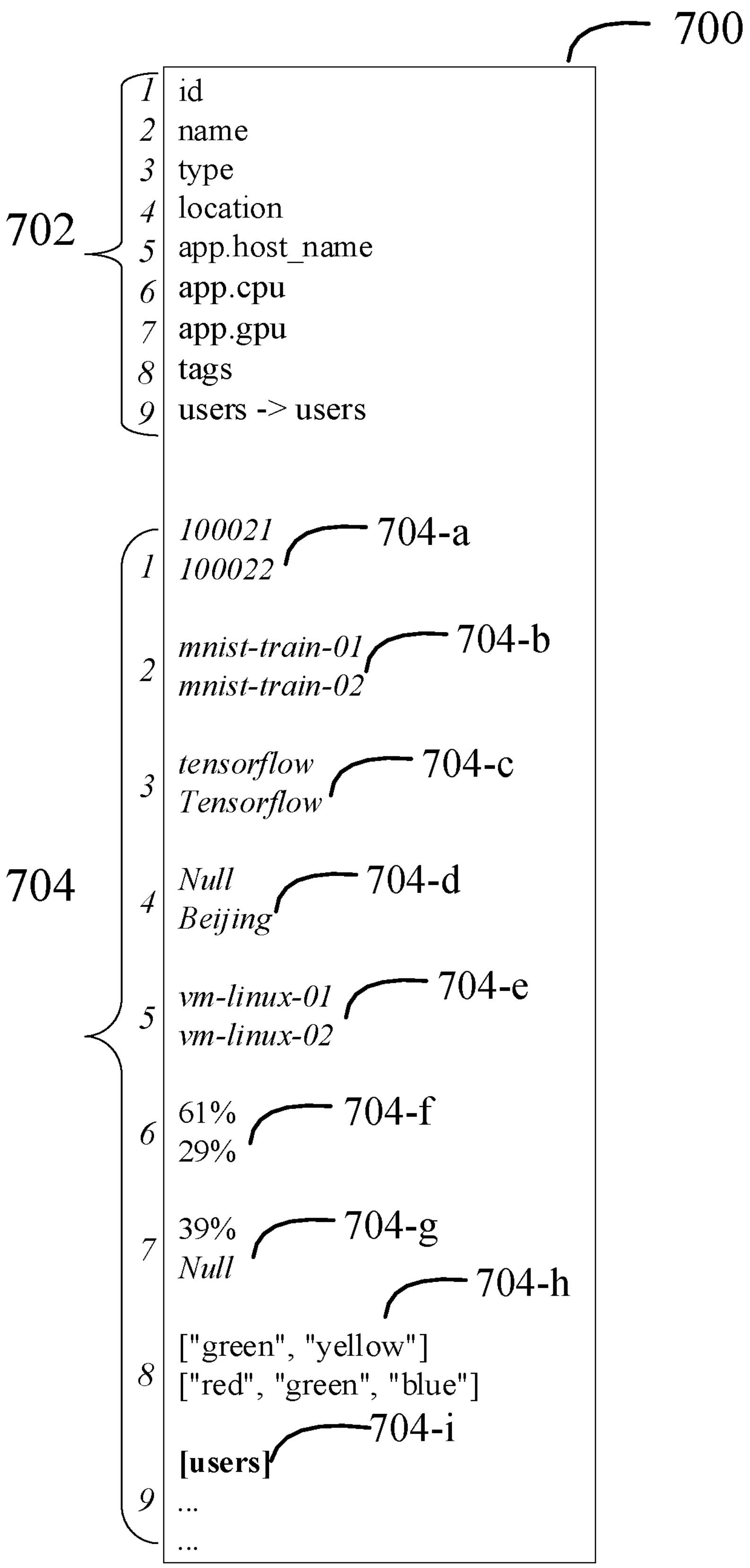
FIG. 7 depicts a reorganized data format obtained by processing data in a data format with key-value pairs according to an embodiment of the present disclosure.
Figure 8:
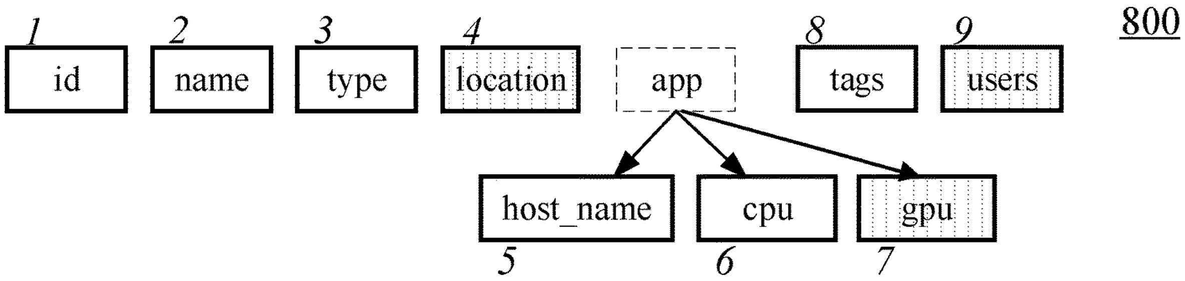
FIG. 8 depicts a predetermined order for arranging extracted keys in a key portion in a reorganized data format according to an embodiment of the present disclosure.

FIG. 7 depicts another reorganized data format 700 obtained by processing data in a data format 600 with key-value pairs according to an embodiment of the present disclosure. FIG. 8 depicts a predetermined order 800 for arranging the extracted keys in the key portion in the reorganized data format 700 according to an embodiment of the present disclosure. Details on the reorganized data format 700 and the predetermined order 800 will be described as follows.

As shown in FIG. 7 and FIG. 8, the predetermined order 800 for arranging the extracted keys in the key portion 702 of the reorganized data format 700 can be an order of traversing leaf nodes of the tree structure of the data in the data format 600 as shown in FIG. 6. Specifically, when traversing the leaf nodes of the tree structure of the data in the data format 600, the leaf nodes can be traversed in the order in which they appear in the tree structure, such that all the leaf nodes can be extracted as "id", "name", "type", "location", "app.host_name", "app.cpu", "app.gpu", "tags" and "users". For clarity of the differences between the predetermined orders 400 and 800, the keys newly extracted for the data format 600 are marked in background with vertical stripes in FIG. 8, as compared with the keys extracted for the data format 200A. In an embodiment. the predetermined order for arranging the extracted keys is labeled based on natural numbering (e.g., 1 through 9) of the extracted keys when traversing all the leaf nodes of the tree structure, such that a union set of all the leaf nodes of the data structure of data format 600 can be determined.

Similar to those shown in FIG. 3, in the reorganized data format 700, the extracted keys can be arranged in the key portion 702 in a predetermined order, and the values of each of the plurality of data objects can be arranged in the value portion 704 in an order corresponding to the order of the keys. In this example, the values corresponding to each of the extracted keys for the plurality of data objects are grouped into a respective value group, and the respective value groups are arranged in the respective value partitions 704-*a* though 704-*i*, and the order for arranging the respective value groups are labeled with a same set of natural numbers from 1 to 9. For example, as mentioned above, a key "location" exists in data object 602-*b* but not in data object 602-*a* for the data format 600 in FIG. 6, and in this case, the value paired with key "location" for data object 602-*a* can be simply identified as null, as shown in FIG. 7. In this manner, the predetermined order for the extracted keys is an order of traversing leaf nodes of the tree structure of the data in the data format 600, and the same order is used for the arranging the values, which allows for easy readability and direct search of the compressed data.

It should be noted that although not shown in FIG. 7, the duplicated or reused parts shared by the values (e.g., the values in respective value groups arranged in respective value partition 704*a* through 704-*i* of the value portion 704) of different data objects of the plurality data object can also be removed, for example, by replacing the reused part by a reference thereto, such that the amount of data required to store or transmit the compressed data can be further reduced, similar to those described in connection with FIG. 5 and details are omitted herein.

Referring back to FIG. 6 and as mentioned above, each of data object 602-*a*, data object 602-*b* includes a key "users" paired with a nested complex array written within a pair of square brackets. For each nested array, it may include three data objects each written in a pair of curly braces, and each of the three data objects may include a collection of nested keys "username", "gender" and "age" and the counterpart values paired with them. The complex nested structure of the data format, which may store nested objects and/or nested arrays as values assigned to respective keys in a hierarchical structure, is a common property that can be found in the standard data-interchange formats with key-value pairs, such as XML and JSON. According to embodiments of the present disclosure, the complex nested array having another collection of key-value pairs can be separated out and the same strategy for compressing data with key-value pairs described in connection with FIGS. 2-5 can be reused.

For example, as shown in FIG. 7, a pointer "users→users" can be arranged in the key portion 702 of the data format 700, which points to a value partition 704-*i* of the value portion 704 of the data format 700. Accordingly, for the data elements arranged in the value partition 704-*i*, the same strategy of compressing data by removing duplicated keys and arranging the keys and values according to a consistent order (and optionally, by replacing a reused part of the values by a reference thereto) can be used, details are omitted herein.

As mentioned above, by arranging the extracted keys and the counterpart values in a consistent order, the amount of data required by the data storage or transmission is reduced, while a direct search within the compressed data is still possible. The details on the direct search for a particular search keyword within the compressed data which will be described hereinafter.

In an embodiment, one of the keys of the plurality of data objects of the data can be identified based on a search keyword, such that a search range within the value portion corresponding to the identified key based on the order of the keys can be determined. Accordingly, the searching for the search keyword can be performed within the search range corresponding to the identified key.

For example, a user may want to search for a keyword "linux" in the uncompressed JSON data (as mentioned earlier, a search in the compressed JSON data is impossible according to existing data compression approaches, and traditionally, the search can be only done in the uncompressed JSON data), this keyword is typically contained in a value paired with the key "app.host_name" in the key-value pairs of the data format 200A as shown in FIG. 2 and the data format 600 as shown in FIG. 6. In this case, a user may enter the keyword "linux" via an input device (such as keyboard, touchscreen and the like) of a computer that stores the compressed data.

Traditionally, the computer needs to iterate all rows of the JSON data on a per data object basis to determine if there is a match. Therefore, all the key-value pairs of a preceding data object of the multiple data objects in the data format 200A or 600 (e.g., data object 202-*a* in FIG. 2) should be checked before moving on to a next data object (e.g., data object 202-*b* in FIG. 2), and the search efficiency is relatively low.

In contrast, according to embodiments of the present disclosure, based on the search keyword "linux", the corresponding key "app.host_name" can be identified, for example, based on a fixed pairing of the key and the search keyword commonly seen in the data formats with key-value pairs. Alternatively, the key can be identified based on the search keyword and hint information entered by the user. Other approaches for determining the key based on a search keyword can be contemplated in the present disclosure.

Accordingly, a search range within the value portion corresponding to the identified key based on the order of the keys can be determined. For example, in the organized data format 300 as shown in FIG. 3, with respect to the search keyword "linux", the search range can be determined as the value partition 304-*d* of the value portion 304, which corresponds to the key "app.host_name". As another example, in the organized data format 500 as shown in FIG. 5, the search range can be determined as the reused-part partition 506 of the value portion 504 (in case that the search keyword is determined as the reused part shared by the values of different data object), or the value partition 504-*d* of the value portion 504 (in case that the search keyword is the non-duplicated part of the values for different data object), or a combination of the reused-part partition 506 and the value partition 504-*d* of the value portion 504 (in case that the search keyword is split between the reused part shared by the values of different data objects and the non-duplicated part of the values for different data object). In such a way, the searching for the search keyword can be performed within the limited search range, which is easier to search and filter data elements and allows for a direct search in the compressed data with a limited data range at a higher search efficiency.

Aspects of the present disclosure are described in the context of JSON data. However, it should be noted that the embodiments of the present disclosure for processing data in a data format with key-value pairs also apply to various types of data format with key-value pairs, which allows for significant storage savings, faster transmission and direct search of the compressed data. The present disclosure does not restrict the detailed data format of the data to be processed.

Figure 9:
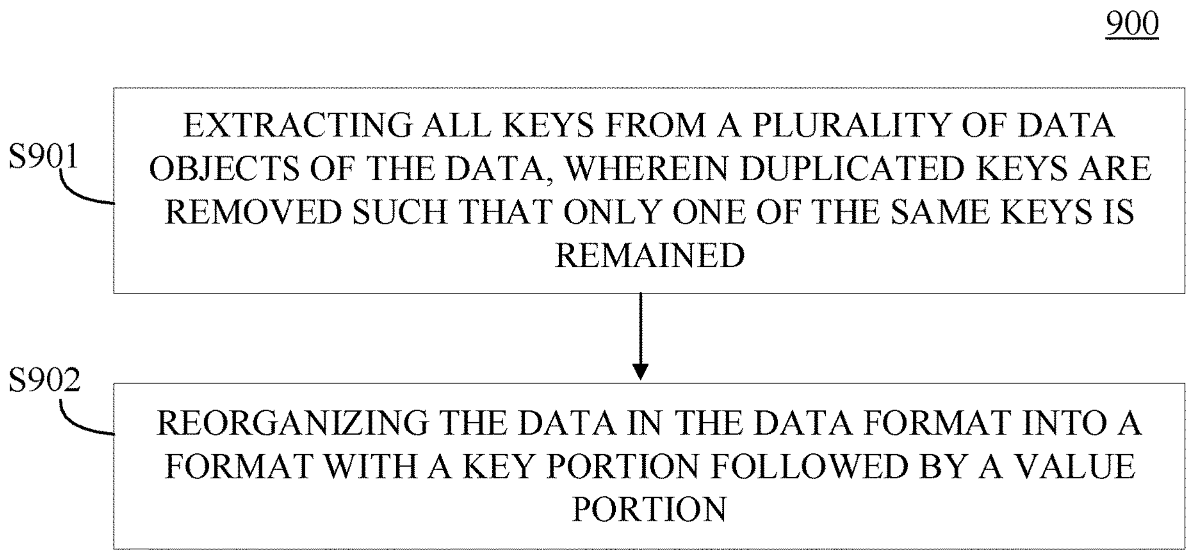
FIG. 9 shows a flowchart of a computer-implemented method for processing data in a data format with key-value pairs according to an embodiment of the present disclosure.

FIG. 9 shows a flowchart of a computer-implemented method 900 for processing data in a data format with key-value pairs according to an embodiment of the present disclosure. The detailed description of method 900 can refer to the content described in the above with respect to FIGS. 1-8. It should be noted that the processing of the data in a data format with key-value pairs according to embodiments of this disclosure could be implemented in the computing environment of FIG. 1. Each step of method 900 can be performed by one or more processing units, such as central processing unit (CPU).

With reference to FIG. 9, method 900 includes steps 901-902.

At step 901, all keys can be extracted from a plurality of data objects of the data. Specifically, duplicated keys can be removed such that only one of the same keys is remained.

At step 902, the data in the data format can be reorganized into a format with a key portion followed by a value portion. Specifically, the extracted keys can be arranged in the key portion in a predetermined order, and the values of each of the plurality of data objects can be arranged in the value portion in an order corresponding to the order of the keys.

In an embodiment, the values corresponding to each of the extracted keys for the plurality of data objects can be grouped into a respective value group, and the respective value groups can be arranged in the value portion in the order corresponding to the order of the keys.

Optionally, method 900 can also include a step of determining a reused part shared by the values of different data objects of the plurality of data objects. For this step, the value portion includes a reused-part partition in which the reused part is arranged in a position corresponding to a reference to the reused part, and the reused part of the values sharing the reused part in the value portion can be replaced by the reference to the reused part.

In an embodiment, the reused part can be arranged in the reused-part partition as one of a list of reused parts shared by the values of the different data objects, and the reference to the reused part includes the position of the reused part within the list of the reused-part partition.

In another embodiment, the values corresponding to each of the extracted keys for the plurality of data objects can be grouped into a respective value group. The respective value groups can be arranged in respective value partitions of the value portion in the order corresponding to the order of the keys, the value partitions of the value portion following the reused-part partition. The reused part of the values sharing the reused part in a respective value partition can be replaced by the reference to the reused part.

Optionally, method 900 can also include a step of identifying one of the keys of the plurality of data objects of the data based on a search keyword; a step of determining a search range within the value portion corresponding to the identified key based on the order of the keys; and a step of searching for the search keyword within the search range corresponding to the identified key.

In an embodiment, the predetermined order for the extracted keys can be an order of traversing leaf nodes of a tree structure of the data in the data format with key-value pairs.

Optionally, method 900 can also include a step of storing and/or transmitting the data in the reorganized format.

Figure 10:
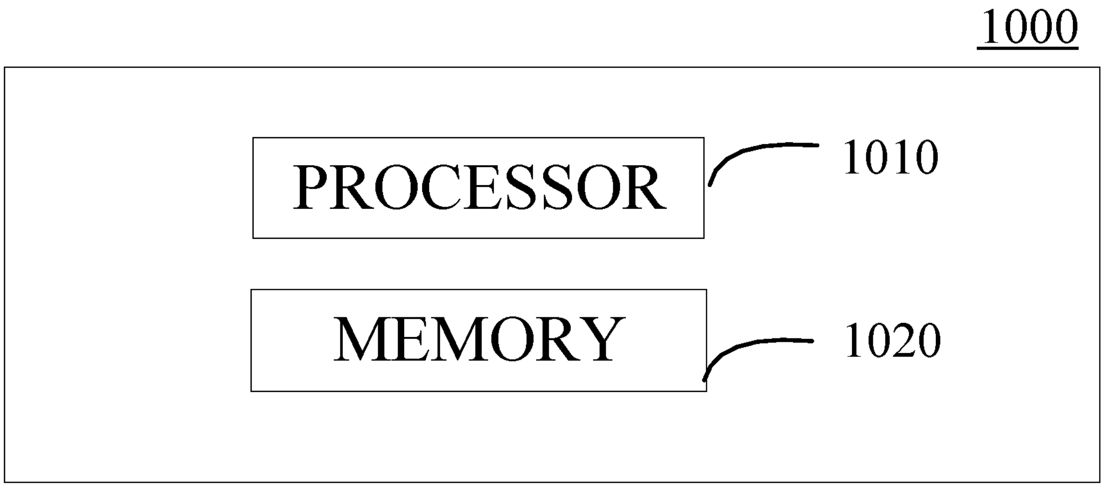
FIG. 10 shows a system for processing data in a data format with key-value pairs according to an embodiment of the present disclosure.

FIG. 10 shows a system 1000 for processing data in a data format with key-value pairs according to an embodiment of the present disclosure. The system 1000 for processing data in a data format with key-value pairs includes one or more processors 1010 and a memory 1020 coupled to at least one of the processors 1010. A set of computer program instructions are stored in the memory 1020. When executed by at least one of the processors 1010, the set of computer program instructions perform a following series of actions. All keys can be extracted from a plurality of data objects of the data. Duplicated keys can be removed such that only one of the same keys remains. The data in the data format can be reorganized into a format with a key portion followed by a value portion. The extracted keys can be arranged in the key portion in a predetermined order. The values of each of the plurality of data objects can be arranged in the value portion in an order corresponding to the order of the keys.

In an embodiment, the values corresponding to each of the extracted keys for the plurality of data objects can be grouped into a respective value group, and the respective value groups can be arranged in the value portion in the order corresponding to the order of the keys.

In an embodiment, the set of computer program instructions can further perform an action of determining a reused part shared by the values of different data objects of the plurality of data objects. For this action, the value portion includes a reused-part partition in which the reused part is arranged in a position corresponding to a reference to the reused part, and the reused part of the values sharing the reused part in the value portion can be replaced by the reference to the reused part.

In an embodiment, the reused part can be arranged in the reused-part partition as one of a list of reused parts shared by the values of the different data objects, and the reference to the reused part includes the position of the reused part within the list of the reused-part partition.

In another embodiment, the values corresponding to each of the extracted keys for the plurality of data objects can be grouped into a respective value group. The respective value groups can be arranged in respective value partitions of the value portion in the order corresponding to the order of the keys, the value partitions of the value portion following the reused-part partition. The reused part of the values sharing the reused part in a respective value partition can be replaced by the reference to the reused part.

In an embodiment, the set of computer program instructions can further perform an action of identifying one of the keys of the plurality of data objects of the data based on a search keyword; determining a search range within the value portion corresponding to the identified key based on the order of the keys; and searching for the search keyword within the search range corresponding to the identified key.

In an embodiment, the predetermined order for the extracted keys can be an order of traversing leaf nodes of a tree structure of the data in the data format with key-value pairs.

In an embodiment, the set of computer program instructions can further perform an action of storing and/or transmitting the data in the reorganized format.

In addition, according to another embodiment of the present disclosure, a computer program product for processing data in a data format with key-value pairs is disclosed. As an example, the computer program product includes a non-transitory computer readable storage medium having program instructions embodied therewith, and the program instructions are executable by a processor. When executed, the program instructions cause the processor to perform one or more of the above described procedures, and details are omitted herein for conciseness.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for processing data in a data format with key-value pairs, comprising:

extracting all keys from a plurality of data objects, wherein duplicated keys are removed such that only one of a same key remains;

reorganizing the data in the data format into a format with a key portion followed by a value portion, wherein the extracted keys are arranged in the key portion in a predetermined order, and the values of each of the plurality of data objects are arranged in the value portion in an order corresponding to the order of the keys;

grouping the values corresponding to each of the extracted keys for the plurality of data objects into a respective value group, wherein the respective value groups are arranged in respective value partitions of the value portion in the order corresponding to the order of the keys;

determining a reused part shared by the values of different data objects of the plurality of data objects, wherein the reused part of the values sharing the reused part in the value portion is replaced by a reference to the reused part, wherein the value portion comprises a reused-part partition in which the reused part is arranged in a position corresponding to a reference to the reused part;

arranging all respective value groups in a value portion in an order corresponding to an order of the keys, such that a consistent order is used for the keys and values, wherein the reused part is arranged in the reused-part partition as one of a list of reused parts shared by the values of the different data objects; and compressing data into a reorganized data format with the key portion followed by a value portion.

2. The computer-implemented method of claim 1, wherein the respective value groups are arranged in the value portion in the order corresponding to the order of the keys.

3. The computer-implemented method of claim 1, wherein the reference to the reused part comprises the position of the reused part within the list of the reused-part partition.

4. The computer-implemented method of claim 1, wherein the value partitions of the value portion following the reused-part partition, wherein the reused part of the values sharing the reused part in a respective value partition is replaced by the reference to the reused part.

5. The computer-implemented method of claim 1, further comprising:

identifying one of the keys of the plurality of data objects of the data based on a search keyword;

determining a search range within the value portion corresponding to the identified key based on the order of the keys; and searching for the search keyword within the search range corresponding to the identified key.

6. The computer-implemented method of claim 1, wherein the predetermined order for the extracted keys is an order of traversing leaf nodes of a tree structure of the data in the data format with key-value pairs.

7. The computer-implemented method of claim 1, further comprising: storing the data in the reorganized format.

8. The computer-implemented method of claim 1, further comprising: data format comprises JavaScript Object Notation (JSON).

9. A computer system for processing data in a data format with key-value pairs, comprising:

one or more computer processors, one or more computer-readable storage media, and program instructions stored on the one or more of the computer-readable storage media for execution by at least one of the one or more processors, wherein the computer system is capable of performing a method comprising:

extracting all keys from a plurality of data objects, wherein duplicated keys are removed such that only one of a same key remains;

reorganizing the data in the data format into a format with a key portion followed by a value portion, wherein the extracted keys are arranged in the key portion in a predetermined order, and the values of each of the plurality of data objects are arranged in the value portion in an order corresponding to the order of the keys;

grouping the values corresponding to each of the extracted keys for the plurality of data objects into a respective value group, wherein the respective value groups are arranged in respective value partitions of the value portion in the order corresponding to the order of the keys;

determining a reused part shared by the values of different data objects of the plurality of data objects, wherein the reused part of the values sharing the reused part in the value portion is replaced by a reference to the reused part; determining a reused part shared by the values of different data objects of the plurality of data objects, wherein the reused part of the values sharing the reused part in the value portion is replaced by a reference to the reused part, wherein the value portion comprises a reused-part partition in which the reused part is arranged in a position corresponding to a reference to the reused part;

arranging all respective value groups in a value portion in an order corresponding to an order of the keys, such that a consistent order is used for the keys and values wherein the reused part is arranged in the reused-part partition as one of a list of reused parts shared by the values of the different data objects; and compressing data into a reorganized data format with the key portion followed by a value portion.

10. The computer system of claim 9, wherein the respective value groups are arranged in the value portion in the order corresponding to the order of the keys.

11. The computer system of claim 9, wherein the reference to the reused part comprises the position of the reused part within the list of the reused-part partition.

12. The computer system of claim 9, wherein the reused part of the values sharing the reused part in a respective value partition is replaced by the reference to the reused part.

13. The computer system of claim 9, further comprising:

identifying one of the keys of the plurality of data objects of the data based on a search keyword;

determining a search range within the value portion corresponding to the 1 identified key based on the order of the keys; and searching for the search keyword within the search range corresponding to the identified key.

14. The computer system of claim 9, wherein the predetermined order for the extracted keys is an order of traversing leaf nodes of a tree structure of the data in the data format with key-value pairs.

15. The computer system of claim 9, further comprising: storing the data in the reorganized format.

16. The computer system of claim 9, further comprising: data format comprises JavaScript Object Notation (JSON).

17. A computer program product for processing data in a data format with key-value pairs, the computer program product comprising:

one or more computer-readable storage media and program instructions stored on the one or more computer-readable storage media, the program instructions executable by a computing system to cause the computing system to perform a method comprising:

extracting all keys from a plurality of data objects, wherein duplicated keys are removed such that only one of a same key remains;

reorganizing the data in the data format into a format with a key portion followed by a value portion, wherein the extracted keys are arranged in the key portion in a predetermined order, and the values of each of the plurality of data objects are arranged in the value portion in an order corresponding to the order of the keys;

grouping the values corresponding to each of the extracted keys for the plurality of data objects into a respective value group, wherein the respective value groups are arranged in respective value partitions of the value portion in the order corresponding to the order of the keys;

determining a reused part shared by the values of different data objects of the plurality of data objects, wherein the reused part of the values sharing the reused part in the value portion is replaced by a reference to the reused part determining a reused part shared by the values of different data objects of the plurality of data objects, wherein the reused part of the values sharing the reused part in the value portion is replaced by a reference to the reused part, wherein the value portion comprises a reused-part partition in which the reused part is arranged in a position corresponding to a reference to the reused part;

arranging all respective value groups in a value portion in an order corresponding to an order of the keys, such that a consistent order is used for the keys and values wherein the reused part is arranged in the reused-part partition as one of a list of reused parts shared by the values of the different data objects; and compressing data into a reorganized data format with the key portion followed by a value portion.

18. The computer program product of claim 17, further comprising:

identifying one of the keys of the plurality of data objects of the data based on a search keyword;

determining a search range within the value portion corresponding to the identified key based on the order of the keys; and searching for the search keyword within the search range corresponding to the identified key.

* * * * *